(12) United States Patent
Abello et al.

(10) Patent No.: US 9,179,086 B2
(45) Date of Patent: Nov. 3, 2015

(54) SYSTEM AND METHOD FOR PROVIDING DYNAMICALLY UPDATING APPLICATIONS IN A TELEVISION DISPLAY ENVIRONMENT

(75) Inventors: Jean-Pierre Abello, Thornton, CO (US);
Roger Urrabazo, Gilroy, CA (US);
Marco Boerries, Los Altos, CA (US);
Patrick Barry, Palo Alto, CA (US)

(73) Assignee: YAHOO! INC., Sunnyvale, CA (US)

( * ) Notice: Subject to any disclaimer, the term of this patent is extended or adjusted under 35 U.S.C. 154(b) by 1224 days.

(21) Appl. No.: 12/062,703

(22) Filed: Apr. 4, 2008

(65) Prior Publication Data
US 2009/0100361 A1    Apr. 16, 2009

Related U.S. Application Data

(60) Provisional application No. 60/916,386, filed on May 7, 2007.

(51) Int. Cl.
| | |
|---|---|
| *H04N 21/8545* | (2011.01) |
| *H04N 5/44* | (2011.01) |
| *H04N 21/235* | (2011.01) |
| *H04N 21/431* | (2011.01) |
| *H04N 21/435* | (2011.01) |
| *H04N 21/443* | (2011.01) |

(Continued)

(52) U.S. Cl.
CPC ........... *H04N 5/4403* (2013.01); *H04N 21/235* (2013.01); *H04N 21/435* (2013.01); *H04N 21/4312* (2013.01); *H04N 21/4314* (2013.01); *H04N 21/4438* (2013.01); *H04N 21/472* (2013.01); *H04N 21/478* (2013.01); *H04N 21/4722* (2013.01); *H04N 21/4782* (2013.01); *H04N 21/8173* (2013.01)

(58) Field of Classification Search
CPC .............. Y10S 715/977; G06F 3/0481; G06F 3/04817; G06F 3/048; G05B 2219/31474; H04M 1/27455; G09G 5/14; G09G 2340/125; H04N 21/8545; H04N 21/4312; H04N 21/472; H04N 21/8173
USPC ......... 715/718, 719, 764, 795, 796, 804, 835, 715/838, 846, 977; 725/2
See application file for complete search history.

(56) References Cited

U.S. PATENT DOCUMENTS 6,701,526 B1 *  3/2004  Trovato ............................ 725/39
6,724,403 B1 *  4/2004  Santoro et al. ................. 715/765

(Continued)

*Primary Examiner* — Shen Shiau
(74) *Attorney, Agent, or Firm* — James J. DeCarlo; Greenberg Traurig, LLP (57) ABSTRACT

The present invention is directed towards systems and methods for providing a framework for providing one or more applications to a user set top device. The method according to one embodiment of the present invention comprises providing a minimized state wherein installed applications are displayed as one or more minimized widgets on an output device in communication with to the user device wherein the list of the installed applications comprises one or more indications of passively updated content associated with the installed applications. In response to the selection of a minimized widget command, a widget state is provided wherein a portion of the output device is allocated for the display of additional widget content in response to the selection of a minimized widget. In response to a remote control command, a full-screen state is provided wherein full-screen version of the minimized widget may be displayed. Finally, an installed application is displayed in a minimized, widget or full-screen state in response to a user action.

35 Claims, 10 Drawing Sheets

(51) Int. Cl.
*H04N 21/472* (2011.01)
*H04N 21/4722* (2011.01)
*H04N 21/478* (2011.01)
*H04N 21/4782* (2011.01)
*H04N 21/81* (2011.01)

(56) References Cited

U.S. PATENT DOCUMENTS

| | | | |
|---|---|---|---|
| 7,028,264 B2* | 4/2006 | Santoro et al. | 715/765 |
| 2002/0160817 A1* | 10/2002 | Salmimaa et al. | 455/566 |
| 2003/0020671 A1* | 1/2003 | Santoro et al. | 345/1.3 |
| 2005/0283734 A1* | 12/2005 | Santoro et al. | 715/765 |
| 2006/0015846 A1* | 1/2006 | Fraleigh et al. | 717/109 |
| 2006/0047678 A1* | 3/2006 | Miyazaki et al. | 707/102 |
| 2007/0038934 A1* | 2/2007 | Fellman | 715/700 |
| 2007/0061724 A1 | 3/2007 | Slothouber et al. | |
| 2007/0130541 A1* | 6/2007 | Louch et al. | 715/804 |
| 2007/0162850 A1* | 7/2007 | Adler et al. | 715/700 |
| 2008/0034309 A1* | 2/2008 | Louch et al. | 715/766 |
| 2008/0066011 A1* | 3/2008 | Urrabazo et al. | 715/810 |
| 2008/0141153 A1* | 6/2008 | Samson et al. | 715/769 |
| 2008/0165136 A1* | 7/2008 | Christie et al. | 345/173 |
| 2008/0295006 A1* | 11/2008 | LuVogt et al. | 715/764 |
| 2009/0024944 A1* | 1/2009 | Louch et al. | 715/765 |
| 2009/0049384 A1* | 2/2009 | Yau | 715/716 |
| 2009/0259958 A1* | 10/2009 | Ban | 715/765 |
| 2010/0138295 A1* | 6/2010 | Caron et al. | 705/14.49 |

* cited by examiner

SYSTEM AND METHOD FOR PROVIDING DYNAMICALLY UPDATING APPLICATIONS IN A TELEVISION DISPLAY ENVIRONMENT

PRIORITY CLAIM

This application claims the benefit of U.S. Provisional Application No. 60/916,386, entitled "SYSTEM AND METHOD FOR PROVIDING DYNAMICALLY UPDATING APPLICATIONS IN A TELEVISION DISPLAY ENVIRONMENT", filed on May 7, 2007, which hereby are incorporated by reference in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

The invention disclosed herein relates generally to providing constantly connected, dynamic widgets to a display device. More specifically, the present invention is directed towards systems and methods for providing a plurality of constantly connected widgets to a plurality of users that dynamically update widget vitality information via a television set, or similar display device means.

BACKGROUND OF THE INVENTION

With the explosive growth of personal computing, networked computer and information sharing many manufacturers have attempted to incorporate the desirable traits of these technological advances in existing and known technologies. One of these technologies was television, a nearly universal technology with a longstanding foothold in many cultures.

The basic concept of incorporating Internet and PC technologies with television was simple: to provide the user with dynamic, useful data in addition to existing television broadcasts. The proven success of the graphical user interface ("GUI") in modern operating systems led to the obvious solution of including a GUI with television broadcasts. This technique allowed users to utilize a television much like the way he or she would use a personal computer. However, this approach failed to remember the distinction between personal computer and television and inappropriately attempted to combine two technologies targeted for two different goals.

The television from conception to present day remains solely as an entertainment device whereas the personal computer was primarily aimed at allowing a user to perform various tasks quickly and more efficiently. Although advances in personal computing allow a user to utilize a personal computer as an entertainment device (via digital music, video, photography, etc.), the personal computer still remains as an active participation device. Thus, the porting of operating system type functionality to the television (commonly referred to as the "ten foot display") inadvertently transformed the television into a personal computer capable of display television broadcasts; as opposed to a television operative to perform personal computer-like functions. The result was a highly interactive television experience detracting from the relaxing and pleasurable television viewing experience. A user frequently was required to actively participate in updating content to the screen, viewing relevant information and many other tasks typically associated with use of a personal computer.

Thus, there currently exists a need in the art to provide a less intrusive framework for providing dynamic, robust data to the ten foot display that allows a user to be presented with external data, while maintaining the "feel" of watching a television broadcast. The present invention is directed towards systems and methods for providing this framework, a framework for providing minimally intrusive applications ("widgets") to a user via a television device. The applications of the present invention allow a user to be presented with relevant and personalized data with minimal or no interaction from the user. This is accomplished by providing a framework outlining a plurality of states of varying degrees of interactivity, thus allowing a user to control his or her viewing session, from a standard "no interactivity" approach to a more interactive approach. The present invention standardizes this concept into a framework for deploying a near infinite amount of applications to the user seamlessly, effectively and robustly.

SUMMARY OF THE INVENTION

The present invention is directed towards systems and methods for providing a framework for accessing one or more applications to a user set top device. The method of the present invention comprises providing a minimized state wherein installed applications are displayed as one or more minimized widgets on an output device in communication with the user set top device wherein the one or more minimized widgets comprise corresponding indications of passively updated content associated with a given minimized widget.

In a first embodiment, installed applications are further operative to store fresh content associated with the installed applications locally. This may be achieved by said installed applications constantly being connected to a network interface wherein said network interface is connected to the Internet. Additionally, the method of the present invention may further comprise deriving additional widget content from a currently active resource. In one embodiment, the currently active resource comprises a currently viewed television broadcast.

The method of the present invention further comprises providing a widget state wherein a portion of the output device is allocated for the display of additional widget content in response to the selection of a widget in the minimized state wherein additional widget content comprises passively updated content associated with a widget in the widget state. In a first embodiment, displaying additional widget content comprises retrieving a plurality of content items from a remote server. In another embodiment, displaying additional widget content further comprises displaying additional widget content along with first displayed content wherein said first displayed content comprises broadcast data. In a second embodiment, displaying additional widget content comprises retrieving a plurality of content items from a local server. In another embodiment, displaying additional widget content further comprises displaying additional widget content along with first displayed content wherein said first displayed content comprises broadcast data.

In yet another embodiment, the present method may further comprise updating a representation of a given minimized widget in response to updating content associated with a corresponding installed application wherein the representation of a given minimized widget comprises an icon. The method of the present invention further comprises providing a full-screen state wherein a full screen version of said minimized widget is displayed in response to a remote control command performed by the user. The framework is stored on the user set top device to thereby provide the minimized state, the widget state and the full-screen state.

The system of the present invention comprises a content provider coupled to a network, a plurality of data providers connected to the network and a client device coupled to the network. The client device is operative to install a plurality of applications on a user device and provide a minimized state wherein installed applications are displayed as one or more minimized widgets on an output device in communication with the user set top device wherein the one or more minimized widgets comprise corresponding indications of passively updated content associated with a given minimized widgets.

In a first embodiment, installed applications are further operative to store fresh content associated with the installed applications locally. This may be achieved by said installed applications constantly being connected to a network interface wherein said network interface is connected to the Internet. Additionally, the system of the present invention may further comprise deriving additional widget content from a currently active resource. In one embodiment, the currently active resource comprises a currently viewed television broadcast.

The client device is further operative to provide a widget state wherein a portion of the output device is allocated for the display of additional widget content in response to the selection of a widget in the minimized state wherein additional widget content comprises passively updated content associated with a widget in the widget state.

In a first embodiment, displaying additional widget content comprises retrieving a plurality of content items from a remote server. In another embodiment, displaying additional widget content further comprises displaying additional widget content along with first displayed content wherein said first displayed content comprises broadcast data. In a second embodiment, displaying additional widget content comprises retrieving a plurality of content items from a local server. In another embodiment, displaying additional widget content further comprises displaying additional widget content along with first displayed content wherein said first displayed content comprises broadcast data.

In yet another embodiment, the client device may further be operative to update a representation of a given minimized widget in response to updating content associated with a corresponding installed application wherein the representation of a given minimized widget comprises an icon. The client device is then operative to provide a full-screen state wherein a full screen version of said minimized widget is displayed in response to a remote control command performed by the user. The framework is stored on the user set top device to thereby provide the minimized state, the widget state and the full-screen state.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE EMBODIMENTS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
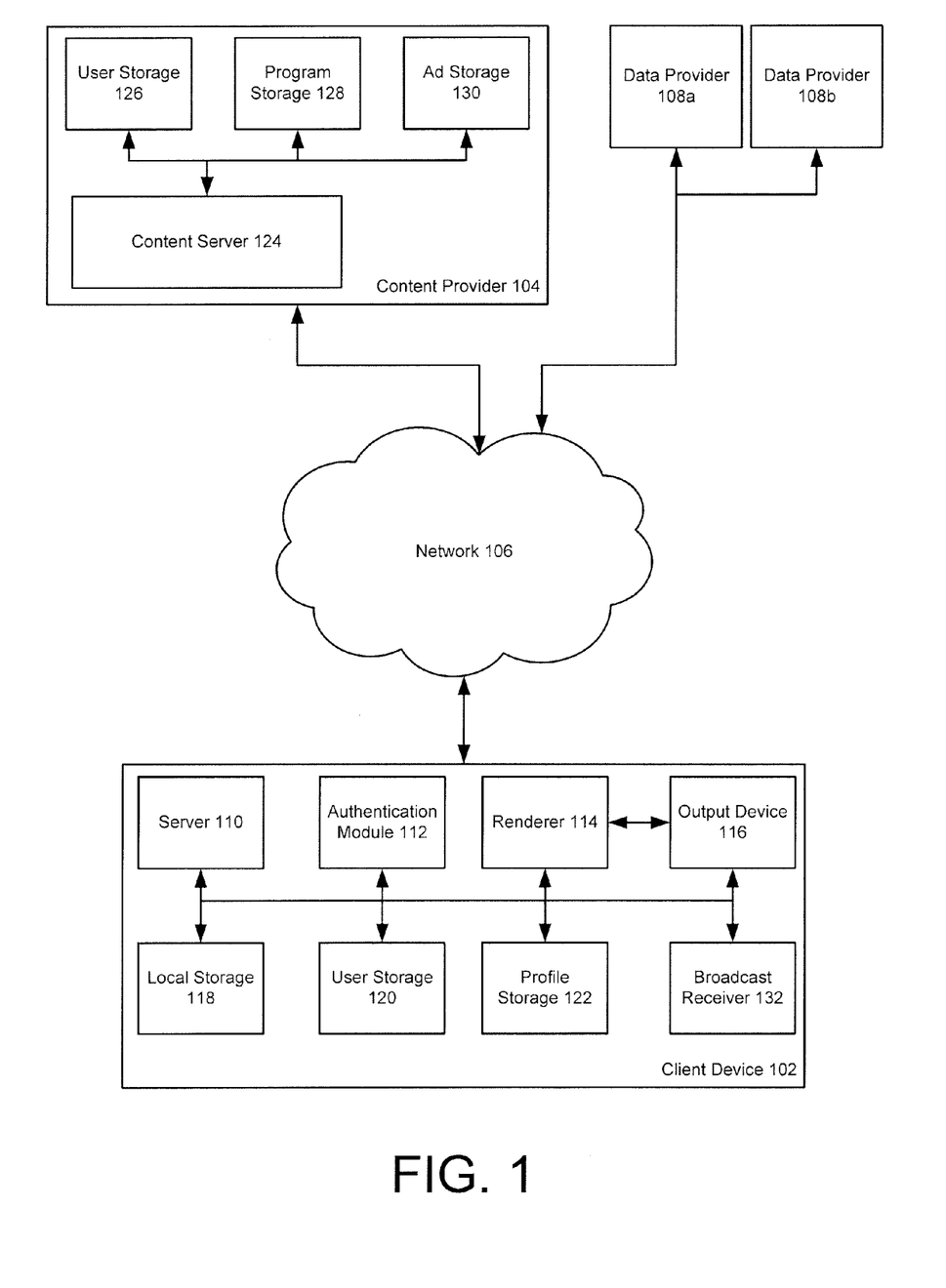
FIG. 1 presents a block diagram illustrating a system for providing a framework for enabling dynamic, vitalized widgets to be displayed on an output device according to one embodiment of the present invention.

FIG. 1 presents a block diagram depicting a system for providing a framework for enabling dynamic, vitalized widgets to be displayed on an output device according to one embodiment of the present invention. According to the embodiment that FIG. 1 illustrates, at least one client device 102 is communicatively coupled to a network 106, which may include a connection to one or more local or wide area networks, such as the Internet. However, it should be noted that client device 102 may be operative to function without a connection to a network 106. For example, a client device 102 may utilize locally stored data (for example, in local storage 118) to update a plurality of on-screen applications, as will be discussed further.

A given client device 102 is in communication with a content provider 104 and one or more data providers 108a and 108b. In the illustrated embodiment, a content provider 104 comprises a content server 124 operative to receive data requests from client device 102 and return appropriate data in response to the received data requests. In addition to a content server 124, a content provider 104 further comprises a plurality of storage devices 126, 128 and 130.

A content provider 104 may comprise user storage 126, operative to store details regarding a requesting user. For example, user storage 126 may contain usernames, passwords and presentation settings corresponding to stored usernames. Content server 124 is operative to authenticate user requests by validating received username/password combinations against stored username/password combinations within user storage 126. Alternatively, more sophisticated authentication mechanisms may be used, such as a token-based authentication mechanism or other authentication techniques known to those of skill in the art.

Content provider 104 may also contain a program storage module 128 operative to store software elements or program code for distribution to a client device 102. In the illustrated embodiment, program storage 128 contains one or more software packages operative to perform distinct or cooperative functions with one or more other packages. For example, program storage may comprise a sports package operative to display relevant scores of athletic games or matches, a movies package may be operative to display a plurality of related movie titles to a currently active movie, etc. Content server 124 is operative to retrieve the appropriate packages from program storage 128, which may include combining one or more retrieved packages to form a final request response sent to a client device 102.

In one embodiment, content server 124 may access user storage 126 to determine one or more packages that are to be delivered to a given client device 102. Furthermore, content server 124 may fetch additional packages from program storage 128 in response to a request for additional packages from a client device 102. Packages retrieved from program storage 128 may request data from one or more data providers 108a and 108b, as is described is greater detail herein.

Content provider 104 may also comprises an ad storage module 130 operative to maintain a database of advertisements. In one embodiment, content server 124 may access the ad storage module 130 to retrieve advertisements for placement in conjunction with a resource returned to a client device 102. In one embodiment, a content server 124 selects advertisements from the ad storage module 130 on the basis of the packages the client device 102 requests, which may also include data transmitted to client device 102. For example, a request for a movies package may result in content server 124 retrieving an advertisement for a movie rental service or similar advertisement. The ad storage module 130 may comprise a variety of advertisement types such as banner ads, full screen ads, textual ads, video ads, audio ads, etc. Content server 124 is operative to select one or multiple ads to include within a returned resource.

The client device 102 may comprise a specialized set-top device operative to output data to a display, such as a television screen, projector or monitor. Client device 102 may also comprise a content server 110 (e.g., an internet web server, etc.) operative to generate requests and receive data from content provider 104 or a plurality of data providers 108a and 108b. Content server 110 further provides the client device with the ability to dynamically update content on a client device without requesting data across network 106.

Client device 102 further comprises an authentication module 112 operative to authenticate a user requesting permission to utilize client device 102. Authentication module 112 may utilize content server 110 to authenticate a user to one or more remote servers, as well as authenticate local users. For example, a client device 102 may maintain one or more user profiles within user storage 120, wherein the authentication module 112 may locally log in a user on the basis of an authentication technique such as a username password. Local authentication allows the client device 102 to customize the display of the present invention on the basis of settings stored within a local profile storage 122, as well as load installed applications that local storage 118 maintains.

Client device 102 further comprises a renderer 114, which may act as a primary display-processing component or module of the client device 102. According to one embodiment, the renderer 114 is operative to receive display information from applications resident in local storage 118, as well as dynamic content received via server 110 across network 106. The renderer 114 may transmit the display data to an output device 116. Output device 116 comprises a display device in the ten foot display environment such as a television.

The primary function of renderer 114 is to provide a working environment, or framework, for applications deployed to the output device 116. Renderer 114 performs operating system-like functions for applications installed on the client device 102. For example, the renderer 114 may control the position of elements overlaid on top of a video display. Renderer 114 renders applications in three different ways: a "minimized" view, a "widget" view and a "full screen" view. In one embodiment, a widget comprises a visualization of an installed application. Widgets may comprise a plurality of visualizations providing a range of interactivity from no interactivity to full interactivity occupying an entire display of an output device. Widget views or states are defined primarily based on the level of interaction available and the area of screen real estate occupied. In an exemplary invention, a widget may occupy three states ranging from very little screen real estate and no interaction to nearly maximum screen real estate and maximum interactivity.

In the minimized view, an application has little or no interactivity, but remains connected to a data source supplying the application with application specific content. For example, a weather application in the minimized state may be represented by an icon that is periodically updated with vitality data such as the current temperature for a predetermined location, said location selected by a user. In the minimized state, the renderer 114 may be operative to detect viewing habits of the user (such as the currently viewed program, or a history of video the user has viewed) and present data to the user without interaction.

The renderer 114 is also operative to update the display to present a larger version of the application (referred to herein as the "widget" state). In the widget state, a widget occupies a larger portion of viewable display area and provides more sophisticated controls (as opposed to simply selecting an icon). For example, upon selecting a FLICKR™ icon, a maximized widget may be presented that displays a list of favorite users or a list of new user photos. A widget may be operative to utilize content server 110 to retrieve content from a remote data provider 180a and 180b, as well as utilize content server 110 to retrieve data (such as user name) from client storage modules 118-122.

An application may also exist in a "full screen" state wherein the rendered 114 outputs a selected widget to occupy a majority of the viewable screen area of output device 116. In this full-screen state, a widget may display even more detailed information than was provided in the maximized widget state. For example, continuing the previous example, a full screen FLICKR™ widget may, in addition, display full screen user photographs or provide additional links such as links to add an image to a shopping cart, etc.

Client device 102 further comprises a broadcast receiver 132 operative to receive broadcast data, such as digital television signals, and display the broadcast data on an output device 116. In addition to displaying broadcast signals to output device 116, broadcast receiver 132 may further be operative to provide data to server 110 indicating the content being displayed on output device 116. That is, server 110 is operative to identify the currently selected broadcast and provide additional content related to the currently viewed broadcast, as will be described in further detail herein. Although broadcast receiver 132 has been described as a device operative to receive television broadcasts, alternative embodiments exist wherein a plurality of other video inputs may be used in lieu of, or in conjunction with, broadcast receiver 132. For example, an output device 116 may be operative to receive video from a DVD input, from video stored in local storage 118, from an external video source via composite input, cached video data or any other source of video signals.

It should be noted that client device 102 is operative to display both widgets rendered by widget renderer 114 and broadcast signals received from broadcast receiver 132. In one embodiment, a broadcast received by broadcast receiver 132 may be overlaid with installed widgets rendered by widget renderer 114. For example, a widget renderer 114 may overlay a "dock" or similar display containing representations of installed widgets.

In one embodiment, a dock of installed widgets is constantly connected to network 106 and dynamically updates the associated content (vitality information) with a given widget. For example, a FLICKR™ widget may constantly check a data provider 108a and 108b for updates to a predetermined set of photos. In one embodiment, server 110 and widget renderer 114 may be operative to update the display of the FLICKR™ widget by updating an icon representing the number of unviewed photos present on data provider 108a and 108b. In an alternative embodiment, server 110 may retrieve data from data providers 108a and 108b and store data locally within local storage 118. In a third embodiment, server 110 and widget renderer 114 may be operative to update an indication of fresh content as well as retrieve the fresh content and store the fresh content locally.

Figure 2:
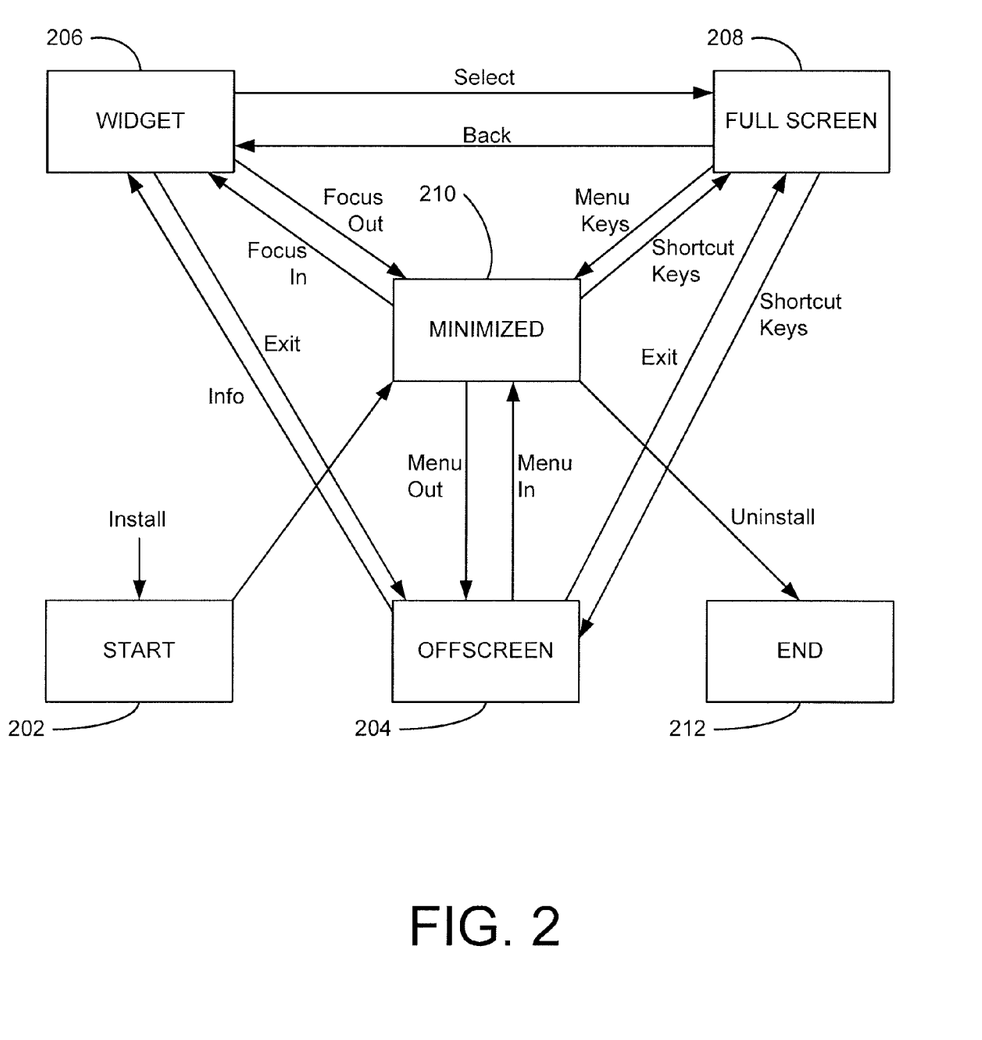
FIG. 2 presents a state diagram illustrating the application lifecycle of a system for providing dynamic widgets according to one embodiment of the present invention.

FIG. 2 presents a state diagram illustrating the application lifecycle of one embodiment of the present invention. The user may initiate the life of the application through the installation or initialization of the system, state 202. In one embodiment, installing the system may comprise installing software on a pre-existing device. That is, a user may be allowed to install the illustrated application on an existing device. In an alternative embodiment, a user may purchase a device with the application pre-loaded onto the device.

The system may proceed to a minimized state, state 210. In one embodiment, applications in the minimized state 210 may appear as icons overlaid on top of a broadcast feed, such as a digital television signal. In this state, applications may remain connected to one or more external data sources. In one embodiment, applications in the minimized state are constantly connected to a network, such as the Internet, and periodically receive vitality information.

Vitality information may comprise fresh data utilized by a given application. For example, a FLICKR™ application may periodically query a FLICKR™ server for new photos corresponding to a set of criteria (such as, photos from particular users) and download the new photos to local storage. Alternatively, vitality information may comprise an indication that a given application has access to fresh data. For example, a FLICKR™ application may contain vitality information which includes a number of new pictures a user has not viewed, such as pictures that have been uploaded to a FLICKR™ server after the last time a user has viewed a set of pictures. In a third embodiment, the minimized state may combined the aforementioned vitality information and provide both an indication of fresh content as well as store the fresh content itself.

While in the minimized state 210, a user may navigate to the widget state 206 via focusing on a given minimized widget in the minimized state 210. Correspondingly, a user may return to the minimized state 110 by unfocusing a selected widget in the widget state 206. In the widget state 206, an application may be given a larger portion of screen real estate, allowing the user to be able to perform limited interactions with a given application. While in the widget state, a plurality of other applications may still be presented to the user in their minimized form. For example, an application in the widget state 206 may comprise a sports widget containing a plurality of game details or scores, whereas a minimized version may only comprise an icon with an indication that an event of interest has occurred.

A user may allot the entire screen space with a selected application by selecting to move an application into the full screen state 208. In the full screen state 208, an application is given all or nearly all of the screen real estate. For example, an application may occupy the entire screen and populate the screen with content retrieved from a remote server. Alternatively, an application may occupy nearly all of the screen space but allow for the continued viewing of a television broadcast. In both embodiments, the application data is rendered as the main focus of the screen.

In the full screen state 208, the user may have complete interactivity with the application. Thus, in the full screen state 208, an application may perform more complex or intensive actions as opposed to the widget or minimized state. In one embodiment, an application may provide functionality akin to a website or installed application. That is, a user may be able to browse products or services, retrieve personalized information or retrieve data according to a plurality of user settings. For example, a full screen FLICKR™ application may allow a user to navigate through one or more photo albums, organize existing photos, browse through a global database of photos, etc.

In the widget state 206, minimized state 210 and full screen state 208, a user may decide to move the installed applications off screen into an off-screen state 204. In the off-screen state, one or more applications may be hidden from view but retain connections to external networks. Finally, a user may end the application by moving into the end state 212, which may comprise uninstalling the previously described application.

Figure 3:
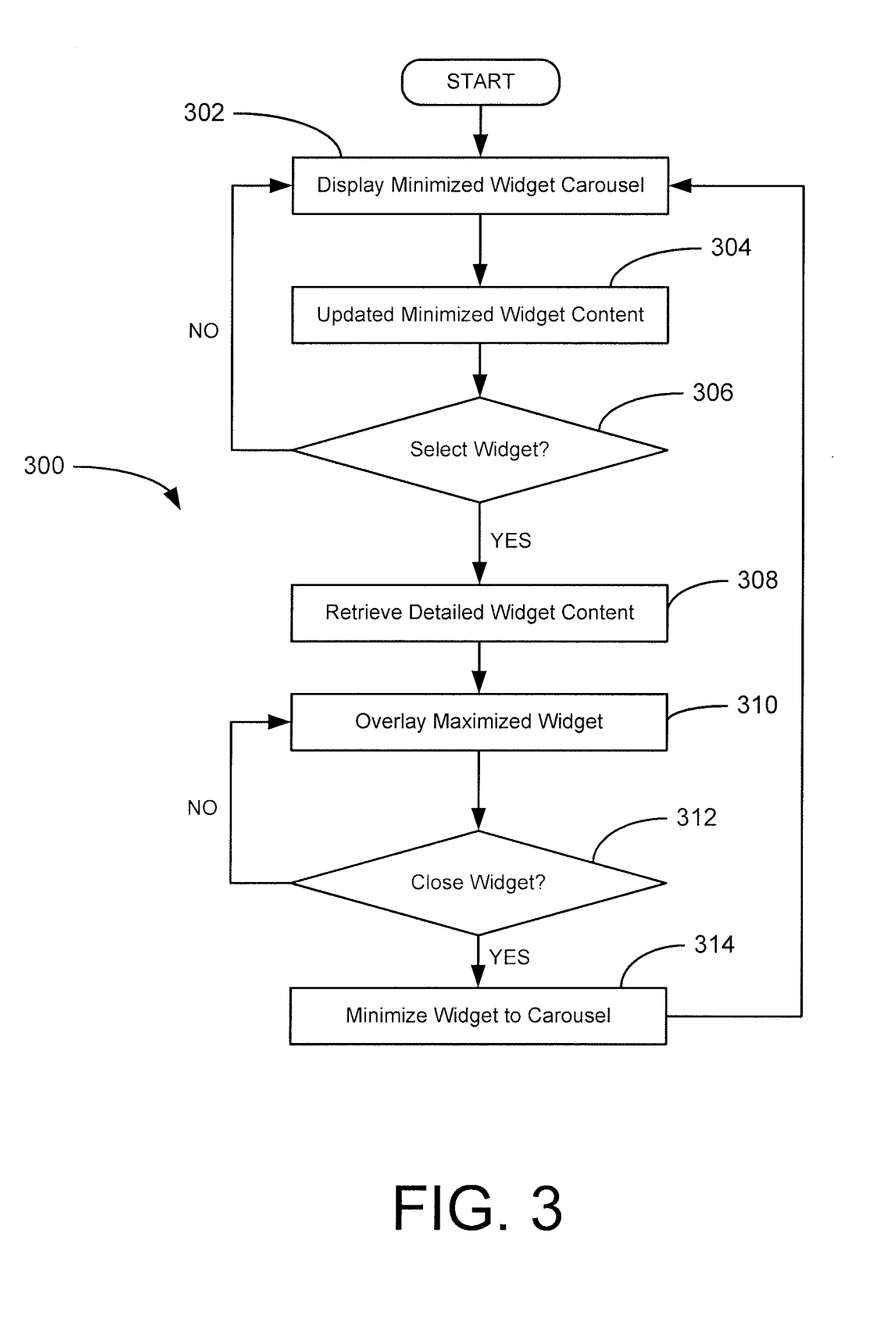
FIG. 3 presents a flow diagram illustrating a method for displaying widgets from a minimized main widget menu according to one embodiment of the present invention.

FIG. 3 presents a flow diagram illustrating a method for displaying widgets from a main widget menu according to one embodiment of the present invention. The method of FIG. 3 displays a minimized widget carousel, step 302. In one embodiment, a main widget menu may comprise a graphical element present on a user display, such as the bottom of a user display, which indicates one or more available applications. While in the widget carousel, the method 300 updates one or more minimized widget, step 304. In one embodiment, a minimized widget may comprise a dynamic icon containing data that a remote data server is operative to update. For example, a minimized sports application may be dynamically updated to reflect the score of a selected game. Alternatively, a minimized widget may be updated to indicate the update of content provided by the minimized widget. For example, if a particular event has occurred during a sporting event, which may comprise a real time event, the system may update a minimized widget to alert the user of the event, e.g., an exclamation point or similar attention drawing icon or symbol.

If a user does not select a minimized widget, step 306, the method 300 continues to display the minimized widget carousel, step 302. If the user activates a minimized widget, the method 300 retrieves the detailed widget content for display of a maximized widget, step 308. Retrieving detailed widget content may comprise fetching data from one or more remote data sources. Alternatively, retrieving detailed widget content may comprise retrieving local data that the client stores in the background of normal operation, for example, in a local database operative to continuously or periodically received updates.

The method may overlay the maximized widget on the user display, step 310. Overlaying the maximized widget may comprise allocating a portion of the user display for use by the widget. For example, a user may select a minimized widget wherein a portion of the screen, for example, above the carousel, may be allocated to display of data for the selected widget. The maximized widget is operative to retrieve content, which may comprise formatting the content, for presentation according to an application framework. For example, a baseball widget may display the score of a selected game in conjunction with match details including, but not limited to, the name of the current pitcher, opposing batters, base runners, etc.

A widget remains displayed on the user display until a close command is detected, step 312. In one embodiment, a close command is received from a remote controller. In an alternative embodiment, a close command may be received via a software call, such as selecting an on-screen close control. If the method 300 detects a close command, the widget is minimized to the carousel, step 314, and the main widget menu is displayed, step 302.

Figure 4:
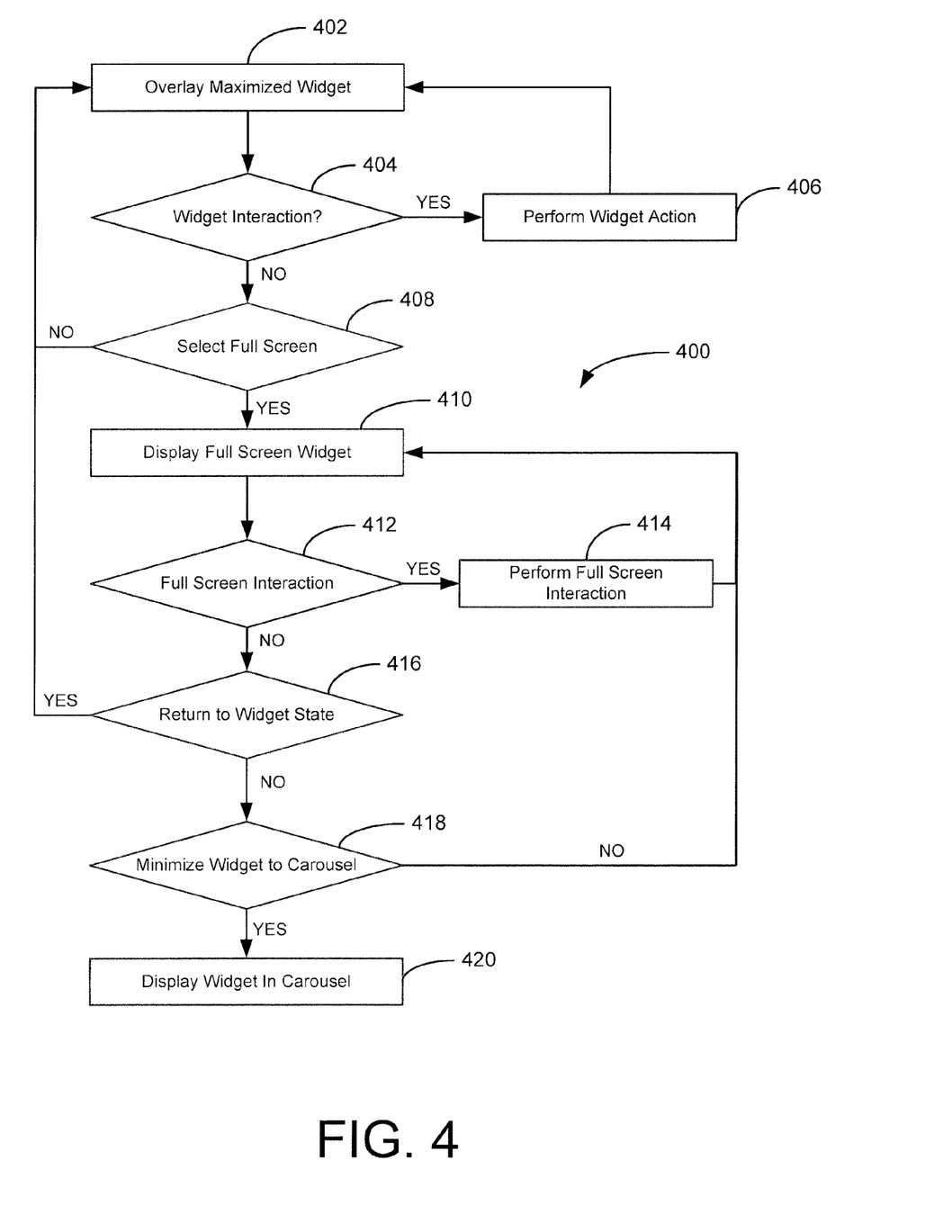
FIG. 4 presents a flow diagram illustrating a method for overlaying full screen widgets on a user display according one embodiment of the present invention.

FIG. 4 presents a flow diagram illustrating a method for overlaying full screen widgets on a user display according one embodiment of the present invention. The method 400 comprises the overlay of a maximized widget on a display device, step 402. In one embodiment, overlaying a maximized widget comprises allocating a portion of screen real estate for use by the widget, as previously described.

After overlaying the widget, the method 400 monitors for user interaction with the maximized widget, step 404. If a user performs a specified action on the maximized widget, the appropriate action is performed, step 406. A specified action may comprise closing a widget, re-positioning a widget, requesting additional information from the widget, etc. Additionally, a user may select a full-screen option, step 408.

If the user selects to view the full screen widget, the method 400 allocates a portion of the screen for use by the full screen widget, step 410, which may include allocation of a majority of the viewable area of the display device for display of the full screen widget. A full screen widget monitors for user interaction with the widget, step 412, and performs the specified action in response to a user interaction, step 414. In one embodiment, an action may comprise a more intensive action as the actions performed on the application in its maximized widget state, steps 404 and 406. For example, a full-screen baseball application may allow a user to view a full box score of multiple games, provide detailed player statistics or biographies, provide league news or provide a plurality of box scores on a single screen, etc.

A user may also select to return a full-screen application to a maximized widget state, step 416. Accordingly, the method 400 re-sizes or re-positions a full-screen application to the maximized widget state and position, step 402. Alternatively, a user may select to return the full-screen widget directly to the minimized widget carousel, step 418. Accordingly, the full-screen widget may be minimized but may remain alive and connected to the web services from which the application receives vitality information, step 420.

Figure 5:
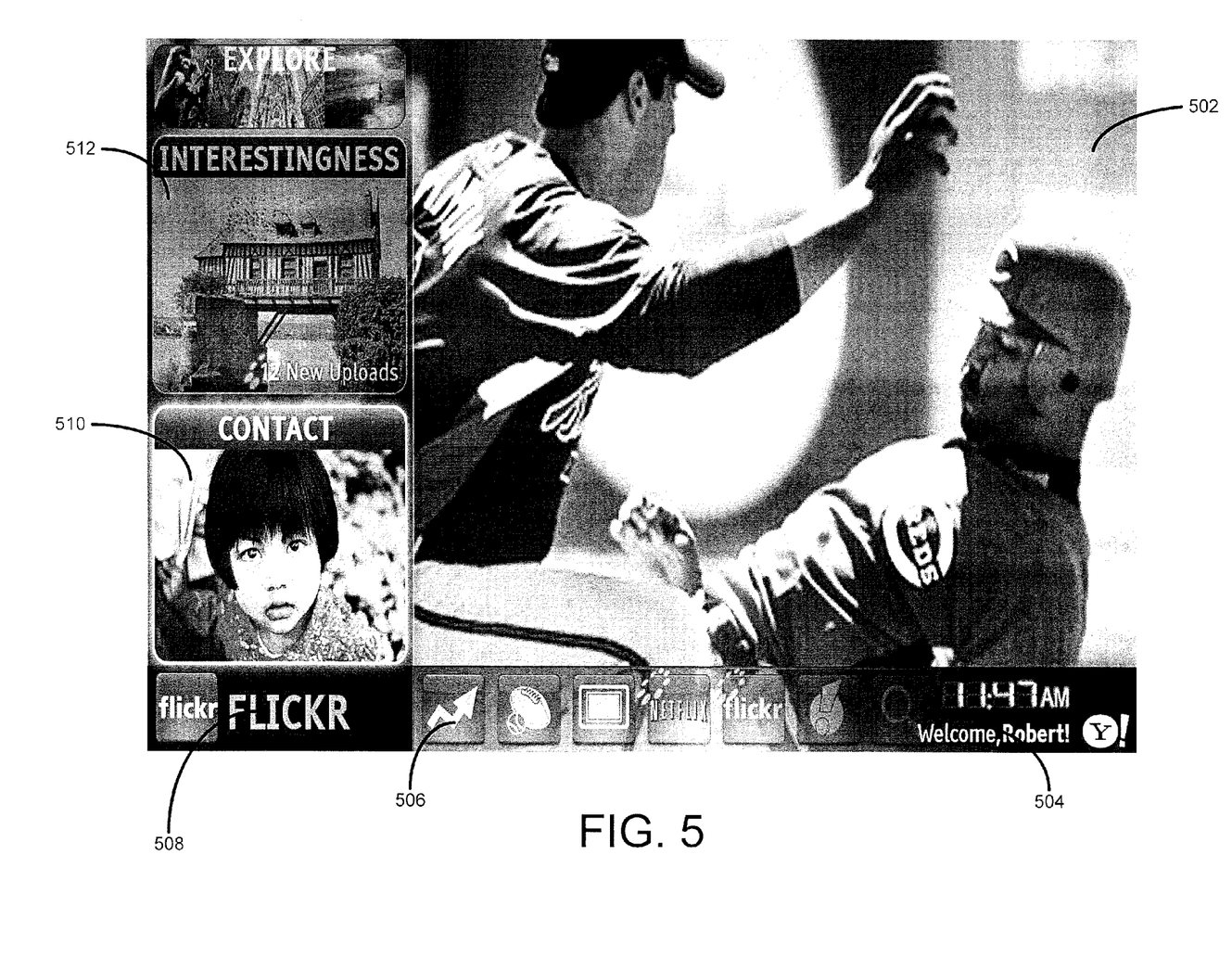
FIG. 5 presents a screen diagram illustrating an interface to a system displaying an active widget according to one embodiment of the present invention.

FIG. 5 presents a screen diagram illustrating one embodiment of a user interface for the display of an active widget. As FIG. 5 illustrates, the user interface comprises a plurality of interactive objects overlaying or otherwise presented in conjunction with a television or other video feed 502. Among these objects is a main widget menu 504 listing one or more of installed applications 506.

In addition to a main widget menu identifying or otherwise listing installed applications 504, FIG. 5 depicts an active application 508 (FLICKR™). As previously described, a maximized widget 508 occupies a larger portion of screen real estate than the application in an associated minimized widget state 506. As illustrated, a FLICKR™ widget 508 may present a plurality of interactive elements 510 and 512 within the allocated widget space.

In the illustrated embodiment, a user may be able to utilize a remote control or other input device to navigate through elements 510 and 512 comprising a maximized widget 508. For example, a FLICKR™ widget 508 may present a plurality of links to a photo album for a given user (510 and 512). In this example, selecting a given photo album element 510 or 512 may transform the widget to full screen and present the album images to the user. In an alternative embodiment, a user may be able to view the album photos within the widget state.

Figure 6:
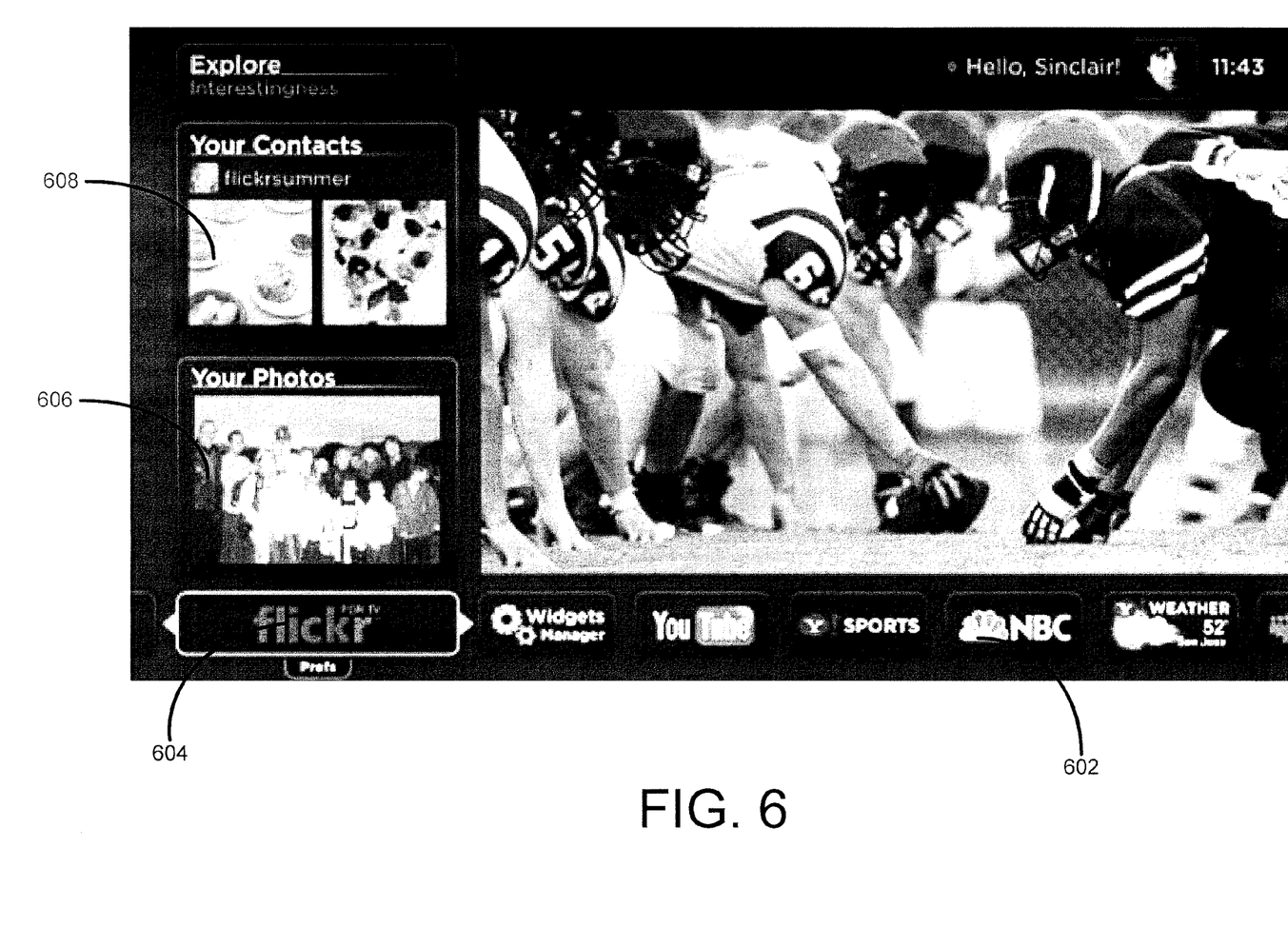
FIGS. 6 through 10 present screen diagrams illustrating interfaces to a system for providing dynamic applications to a set top box according to one embodiment of the present invention.

FIG. 6 presents a screen diagram illustrating one embodiment of a user interface displaying an active widget. As FIG. 6 illustrates, a main widget menu of installed applications 602 is presented to a user, with a user having selected a FLICKR™ application 604 from the widget carousel.

In response to selecting the FLICKR™ application, a portion of the screen is allocated to the FLICKR™ widget in a maximized widget state, and the widget displays application specific data 606 and 608. The embodiment that FIG. 6 illustrates comprises a "Your Photos" element 606, which is created on the basis of a user profile and may be stored at a local or remote location. That is, the FLICKR™ widget 604, upon activation, may retrieve information from a user profile (e.g., a FLICKR™ user database) to update or create the maximized widget elements 606. In the illustrated embodiment, a user database is queried to determine what photos exist for a given user based on his or her profile stored in a FLICKR™ user database.

Figure 7:
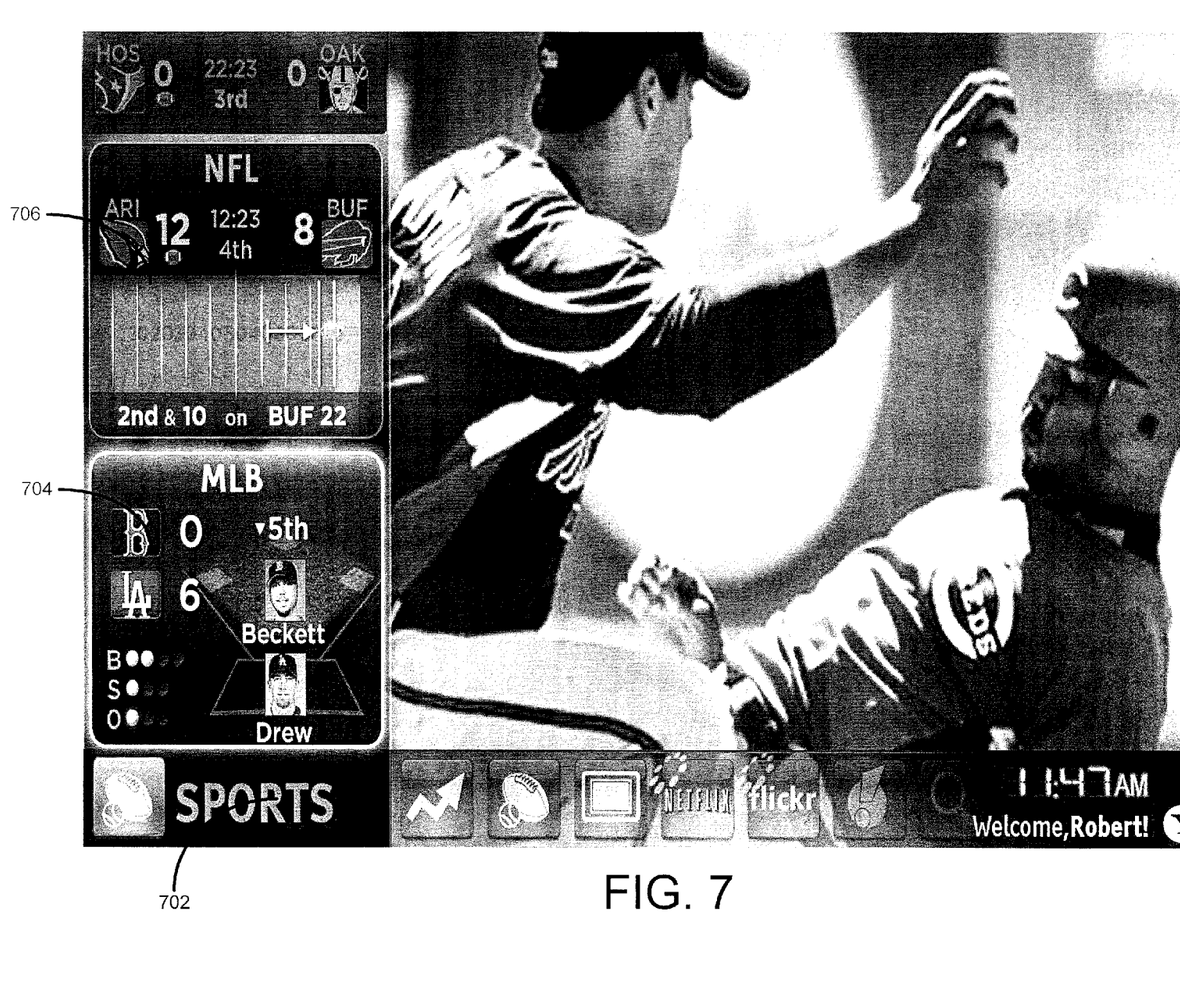

FIG. 7 presents a screen diagram illustrating one embodiment of a user interface displaying an active widget. FIG. 7 presents a maximized sports widget 702. As previously described, upon activation, the maximized widget 702 occupies a larger portion of real estate than when the widget is in a minimized state.

In the illustrated embodiment, a plurality of information related to various games 704 and 706 is provided to the user through the maximized widget interface. In the illustrated embodiment, the information presented to the user may be updated in real time, while the user continues to watch the currently viewed game. Game elements 706 and 704 may further be operative to allow a user to switch the channel to view the selected game.

In a first embodiment, a sports widget 702 may retrieve a plurality of scores based on a user profile. That is, the user in the illustrated embodiment may have selected the Oakland Raiders, Arizona Cardinals and Los Angeles Dodgers as his or her favorite teams, and thus the scores (if available) are displayed to the user. In an alternative embodiment, the sports widget 702 may be operative to intelligently select games to be displayed within the sports widget 702. For example, a sports widget may detect a user is watching a Red Sox game and may choose to present the score of a rival team, such as the Yankees, within the widget. Alternatively, a widget may choose to display a game solely on the basis the popularity of the game. In an alternative embodiment, a widget may elect to choose games on one or more combinations of the previously presented techniques.

Figure 8:
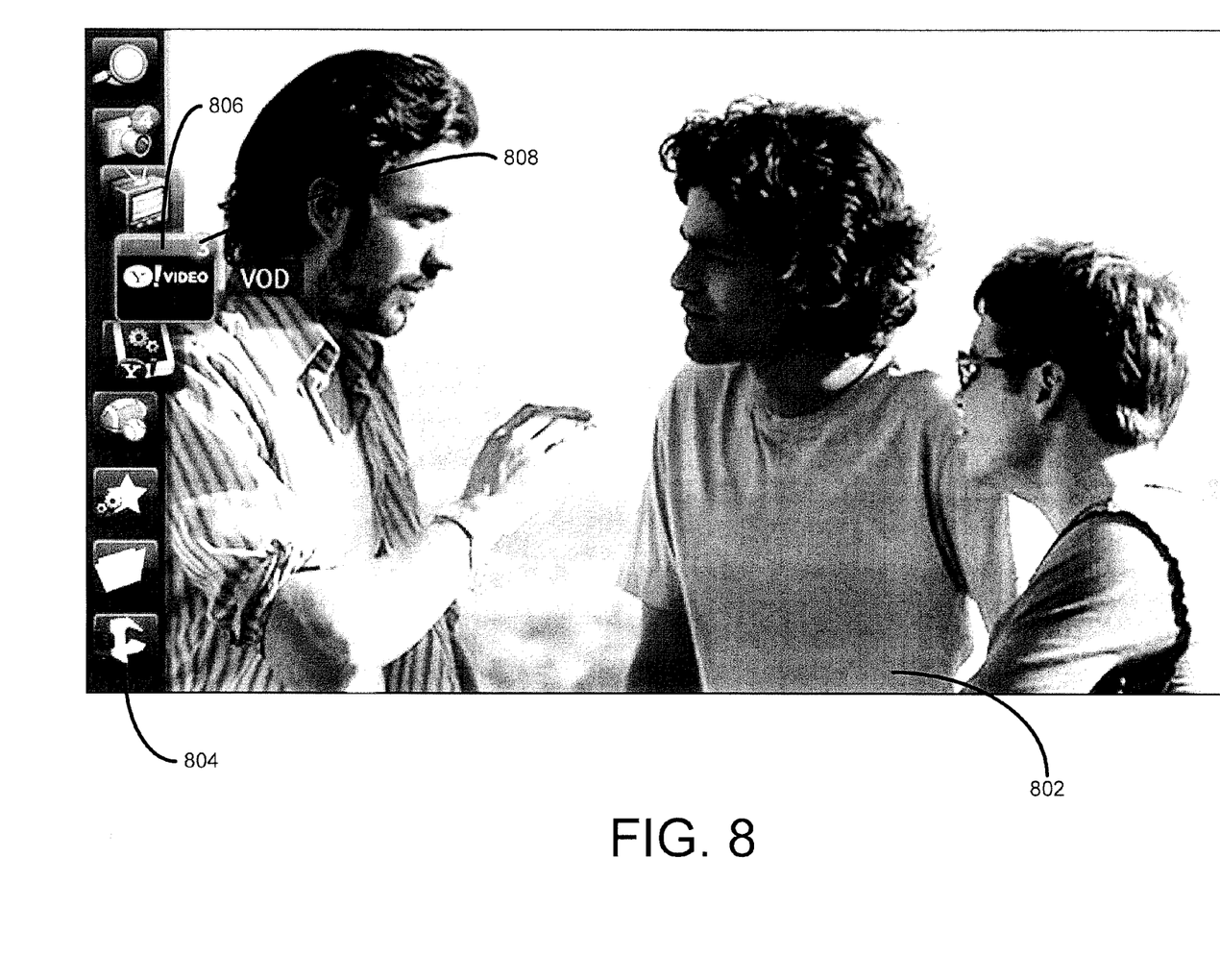

FIG. 8 presents a screen diagram illustrating one embodiment for providing a main widget menu of installed applications in a minimized widget state. As FIG. 8 illustrates, a main widget menu of installed applications 804 is presented vertically on a screen displaying a selected content item 802.

According to one embodiment, a minimized widget 806 may comprise a dynamic element 808 indicating activity by or within the widget. For example, a Video On Demand widget 806 may comprise an indicator 808 alerting the user that three newly updated movie recommendations are available. This indicator allows a user to quickly scan a menu of installed applications to determine those with new or otherwise fresh data through vitality updates obtained by a widget over a network connection, which may be a persistent or intermittent network connection.

Figure 9:
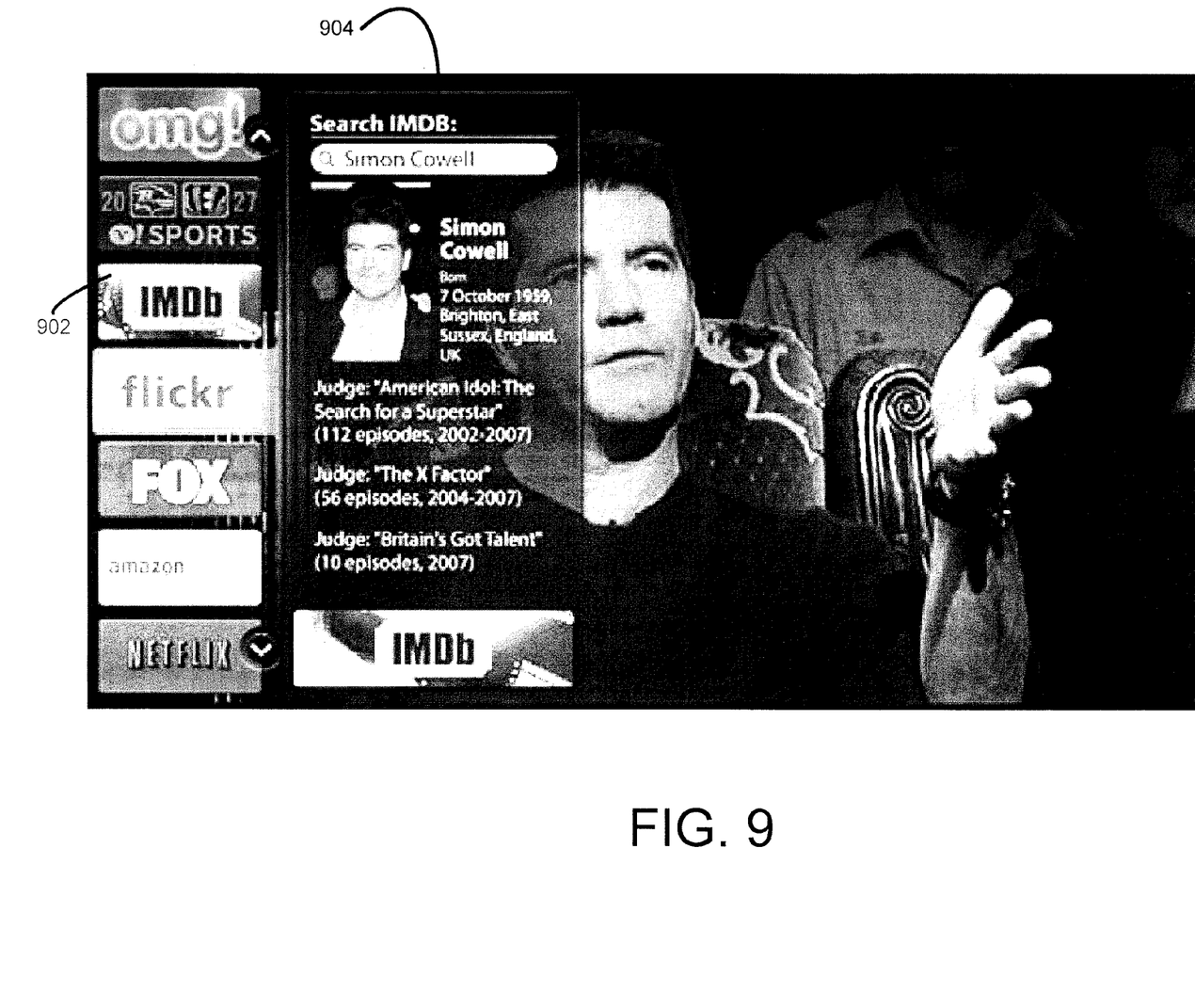

FIG. 9 presents a screen diagram illustrating an application in a widget state in accordance with one embodiment of the present invention. As FIG. 9 illustrates, an IMDB widget 902 is expanded to occupy a portion of the screen. The IMDB widget 902 comprises a single exemplary widget state 904 and in response to the selection of a minimized widget 902, displays the applications in the widget state 904.

The IMDB widget 902 may comprise a search element 904, displaying the results of a user search, e.g., in the illustrated embodiment, a search for "Simon Cowell". In the embodiment of FIG. 9, the application running in the widget state is operative to allow the user to have increased control over the functionality of the widget, allow him or her to input a search query and receive dynamic data on the basis of the search query. In an alternative embodiment, widget 902 may extract or generate dynamic parameters based upon the currently viewed broadcast. For example, the embodiment of FIG. 9 may dynamically determine actors present within the current broadcast and may instruct an IMDB widget 904 to retrieve data about the identified actors.

Figure 10:
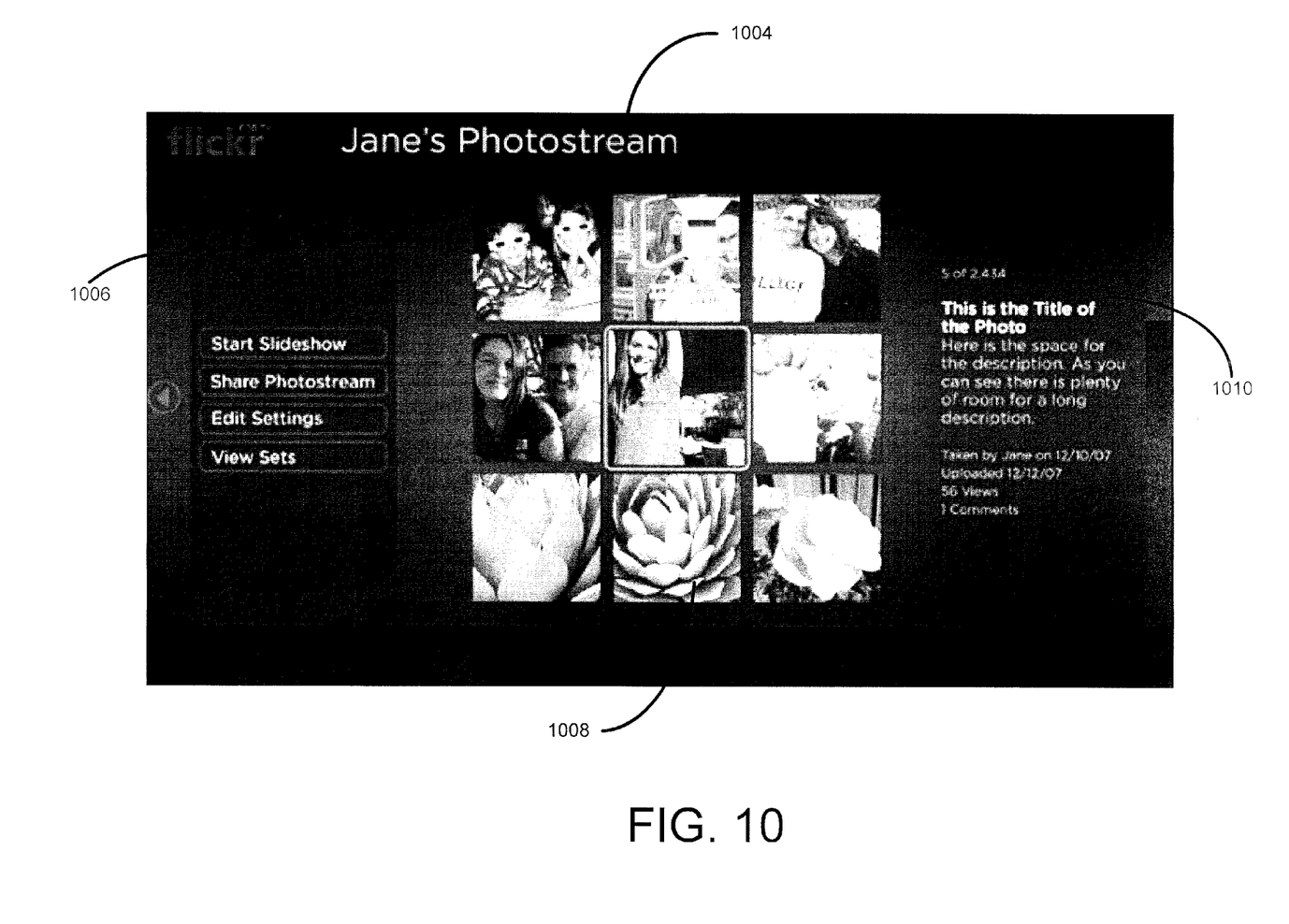

FIG. 10 presents a screen diagram illustrating an application in a full screen state in accordance to one embodiment of the present invention. The embodiment of FIG. 10 illustrates the previously presented FLICKR™ widget in a full screen state. The full screen FLICKR™ widget 1004 comprises a plurality of elements including an application action element 1006, an image gallery 1008 and an image detail element 1010.

As previously described, an image gallery element 1008 may be populated via a variety of techniques. For example, a user may select a particular image gallery from a listing of available image galleries (not shown). For example, a user may select a photo gallery of a friend sharing photos using the FLICKR™ service. The image gallery element 1008 may be operative to retrieve data from remote and local data sources such as an image database. In addition to presenting a list of images in image gallery 1008, the widget may also be operative to retrieve image details, such as an image caption or description, from a remote server and display the retrieved data in image detail element 1010. The illustrated embodiment depicts how a single widget may be operative to retrieve data from a plurality of data sources, thus providing the most comprehensive coverage possible.

FIGS. 1 through 10 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

We claim:

1. A computer-implemented method comprising:
  displaying, via a display screen of a user interface for a computing device, a minimized state for an application, wherein the application is displayed in the minimized state with a first degree of user interactivity, and wherein the application displays dynamically updated application content while in the minimized state, the dynamically updated application content generated from one or more parameters based upon a search query received from the user and information chosen from a group of information types consisting of a video program concurrently displayed on the display screen with the application in the minimized state, and a history of video programs previously viewed by a user of the computing device;

updating, by the computing device, the minimized state for the application in response to updating content associated with a corresponding installed application;

displaying, via the display screen of the computing device, a maximized state for the application in response to selection of the application in the minimized state by the user via the user interface, wherein the application is displayed with a second degree of user interactivity in the maximized state, the second degree of user interactivity being greater than the first degree of user interactivity, and displaying the dynamically updated application content while in the maximized state; and displaying, via the display screen of the computing device, a full-screen state for the application with a third degree of user interactivity that is greater than either the first degree of user interactivity or the second degree of user interactivity, wherein the full screen state for the application is displayed in response to a remote control command.

2. The method of claim 1, wherein said installed applications are further operative to store fresh content associated with the installed applications locally.

3. The method of claim 1, further comprising retrieving information from a user profile.

4. The method of claim 1, further comprising receiving a score for a team; and displaying a score of a rival team.

5. The method of claim 4, further comprising displaying details for one or more individuals related to the team and the rival team.

6. The method of claim 1, further comprising retrieving a plurality of content items from a remote server.

7. The method of claim 1, further comprising displaying a list of favorite users.

8. The method of claim 1, further comprising retrieving a plurality of content items from local storage.

9. The method of claim 8, further comprising displaying, in the maximized state, additional application content.

10. The method of claim 1, further comprising displaying a plurality of links to one or more photo albums for the user.

11. The method of claim 1, further comprising extracting the one or more parameters from currently viewed broadcast data; and retrieving data based on the extraction.

12. A system comprising:
a processor;
a user interface in communication with the processor, the user interface comprising a display screen; and
memory coupled to the processor and storing instructions that, when executed by the processor, cause the system to:
display, via the display screen, a minimized state for an application, wherein the application is displayed in the minimized state with a first degree of user interactivity, wherein the application displays dynamically updated application content while in the minimized state, the dynamically updated application content generated from one or more parameters based upon a search query received from the user and information chosen from a group of information types consisting of a video program concurrently displayed on the display screen with the application in the minimized state, and a history of video programs previously viewed by a user of the system;

update the minimized state for the application in response to updating content associated with a corresponding installed application;

display, via the display screen, a maximized state for the application in response to selection of the application in the minimized state by the user via the user interface, wherein the application is displayed with a second degree of user interactivity in the maximized state, the second degree of user interactivity being greater than the first degree of user interactivity, and wherein the application displays the dynamically updated application content while in the maximized state; and displaying, via the display screen, a full-screen state for the application with a third degree of user interactivity that is greater than either the first degree of user interactivity or the second degree of user interactivity, wherein the full screen for the application is displayed in response to a remote control command.

13. The system of claim 12, wherein said installed applications are further operative to store fresh content associated with the installed applications locally.

14. The system of claim 12, wherein the memory further stores instructions for: retrieving information from a user profile.

15. The system of claim 12,
wherein the memory further stores instructions for:
receiving a score for a team; and
displaying a score of a rival team on the display screen.

16. The system of claim 15, wherein the memory further stores instructions for displaying details for one or more individuals related to the team and the rival team.

17. The system of claim 12, wherein the memory further stores instructions for retrieving a plurality of content items from a remote server.

18. The system of claim 12, wherein the memory further stores instructions for displaying a list of favorite users.

19. The system of claim 12, wherein the memory further stores instructions for retrieving a plurality of content items from local storage.

20. The system of claim 19, wherein the memory further stores instructions for displaying, on the display screen, in the maximized state, additional application content.

21. The system of claim 12, wherein the memory further stores instructions for displaying, on the display screen, a plurality of links to one or more photo albums for the user.

22. The system of claim 12, wherein the memory further stores instructions for:
extracting the one or more parameters from currently viewed broadcast data; and retrieving data based on the extraction.

23. The system of claim 12, wherein the memory further stores instructions for generating new content for the application in the minimized state based on the search query.

24. A non-transitory computer readable storage medium storing instructions that, when executed by a computing device, cause the computing device to:
display, via a display screen of a user interface for the computing device, a minimized state for an application, wherein the application is displayed in the minimized state with a first degree of user interactivity, and wherein the application displays dynamically updated application content while in the minimized state, the dynamically updated application content generated from one or more parameters based upon a search query received from the user and information chosen from a group of information types consisting of a video program concurrently displayed on the display screen with the application in the minimized state, and a history of video programs previously viewed by a user of the computing device;

update the minimized state for the application in response to updating content associated with a corresponding installed application;

display, via the display screen of the computing device, a maximized state for the application in response to selection of the application in the minimized state by the user via the user interface, wherein the application is displayed with a second degree of user interactivity in the maximized state, the second degree of user interactivity being greater than the first degree of user interactivity, and wherein the application displays the dynamically updated application content while in the widget maximized state; and providing, by the computing device, display, via the display screen of the computing device, a full-screen state for the application with a third degree of user interactivity that is greater than either the first degree of user interactivity or the second degree of user interactivity, wherein the full screen state for the application is displayed in response to a remote control command.

25. The non-transitory computer readable storage medium of claim 24, wherein the installed applications are operative to store fresh content associated with the installed applications locally.

26. The non-transitory computer readable storage medium of claim 24, wherein the medium further stores instructions for retrieving information from a user profile.

27. The non-transitory computer readable storage medium of claim 24, wherein the medium further stores instructions for: receiving a score for a team; and displaying a score of a rival team.

28. The non-transitory computer readable storage medium of claim 27, wherein the medium further stores instructions for displaying details for one or more individuals related to the team and the rival team.

29. The non-transitory computer readable storage medium of claim 24, wherein the display of additional application content comprises retrieving a plurality of content items from a remote server.

30. The non-transitory computer readable storage medium of claim 24, wherein the medium further stores instructions for displaying a list of favorite users.

31. The non-transitory computer readable storage medium of claim 24, wherein the medium further stores instructions for retrieving a plurality of content items from local storage.

32. The non-transitory computer readable storage medium of claim 31, wherein the medium further stores instructions for displaying, in the maximized state, additional application content.

33. The non-transitory computer readable storage medium of claim 32, wherein the medium further stores instructions for displaying a plurality of links to one or more photo albums for the user.

34. The non-transitory computer readable storage medium of claim 24, wherein the medium further stores instructions for: extracting the one or more parameters from currently viewed broadcast data; and retrieving data based on the extraction.

35. The non-transitory computer readable storage medium of claim 24, wherein the medium further stores instructions for generating new content for the application in the maximized state based on the search query.

\* \* \* \* \*